US006205429B1

(12) United States Patent
Peng (10) Patent No.: US 6,205,429 B1
(45) Date of Patent: Mar. 20, 2001

(54) SYSTEM AND METHOD TO MANIPULATE INFORMATION IN AN AUDIO DECODER

(75) Inventor: Jason Peng, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/136,817

(22) Filed: Aug. 20, 1998

(51) Int. Cl.[7] .............................. G10L 21/00; G06F 13/00
(52) U.S. Cl. ........................................... 704/500; 345/523
(58) Field of Search ................................... 704/500–502, 704/200, 226, 227, 212; 341/143, 55; 345/523

(56) References Cited

U.S. PATENT DOCUMENTS

| 3,949,299 | * | 4/1976 | Song ..................................... 704/212 |
| 5,245,343 | * | 9/1993 | Greenwood et al. ................. 341/143 |
| 5,644,310 | * | 7/1997 | Laczko, Sr. et al. ................. 704/212 |
| 5,835,043 | * | 11/1998 | Tsuchida .............................. 341/143 |

OTHER PUBLICATIONS

Fast Search™ (Internet search http://www.fast.no, Mar. 9, 2000).*
IEL Online™ (IEEE Search Engine results, Mar. 9, 2000).*

* cited by examiner

*Primary Examiner*—Richemond Dorvil
*Assistant Examiner*—Daniel A. Nolan
(74) *Attorney, Agent, or Firm*—Gregory J. Koerner; Simon & Koerner LLP (57) ABSTRACT

A system and method to manipulate information in an audio decoder, the system having a demultiplexer to separate the information into packets of audio data and packet parameters, a control manager for controlling the packet parameters, and an audio decoder to manipulate the packets of audio data in response to the packet parameters. The invention also includes a control processor for passing host parameters to the control manager and a digital-to-analog converter to convert the audio information from a digital signal to an analog signal.

29 Claims, 8 Drawing Sheets

SYSTEM AND METHOD TO MANIPULATE INFORMATION IN AN AUDIO DECODER

BACKGROUND OF THE INVENTION

1. Field of the Invention

This invention relates generally to a device for manipulating information, and relates more particularly to a device for manipulating information in an audio decoder.

2. Description of the Background Art

Implementing an efficient and effective method for manipulating digital information is a significant consideration of system designers and manufacturers. However, the techniques available to manipulate the digital information often requires expensive modification of existing hardware or the development of new hardware.

Digital information is now in widespread use in consumer products such as compact disc (CD) players, digital video disc (DVD) players, digital video broadcast (DVB), and other systems. This widespread use of digitized audio and video information in the consumer market has led to a demand for more information to be incorporated in a single, convenient form. For example, entire movies may need to be included on a single CD. This demand led, in part, to the development of digital video discs (DVDs).

A single DVD may hold up to twenty-five times more information than a conventional CD. Thus, a single DVD is capable of holding both the video and audio portions of an entire two-hour movie. In addition, a DVD has the capacity to hold variety of other information such as widescreen picture information, six-channel surround sound, multilingual audio tracks, subtitles, and multiple camera angles. These features are not available on a CD because of capacity limitations.

DVD was developed with a standardized file format for the audio portion of the individual data. The standardized file format bundles data into packets of information. Each packet contains a header portion and the audio data portion. The header portion typically contains parameters that the audio system uses to process and playback the audio data. For example, the parameters may contain information about the audio data format, the playback speed, whether the audio data has been downsampled, or the type of data compression used.

A typical DVD system transfers the audio and video data in a continuous stream in which each packet is transferred in sequence. The DVD system transfers each packet beginning at a specific time interval. Until now there has been no convenient method to analyze the parameters within each packet before audio playback. This, in turn, has meant that developers have been unable to modify existing playback systems or to develop new, low-cost systems that advantageously use the information contained in the parameters. In addition, developers have been unable to incorporate user-entered host parameters into the audio data to manipulate the audio playback systems directly from the data. The foregoing problems thus present significant obstacles for effectively implementing an efficient method to manipulate digital information.

SUMMARY OF THE INVENTION

This invention relates generally to a device for manipulating information, and relates more particularly to a device for manipulating information in an audio decoder. Initially, in one embodiment of the present invention, the information is received as a data bit stream that a demultiplexer (DEMUX) separates into video data and audio packets. The video data is manipulated and displayed on a video monitor. The DEMUX further splits the audio packets into packets of audio data and packet parameters. The packets of audio data are stored in dynamic random-access memory (DRAM) and the packet parameters are initially transferred to a control manager. In addition, the control manager receives host parameters from a control processor. The host parameters are generated in response to system user commands to control the processing and playback of the corresponding packet of audio data. After receiving the packet parameters and host parameters, the control manager sends an interrupt command to an audio decoder notifying the audio decoder that the control manager has parameters to load. Each set of packet parameters directly correspond to a specific packet of audio data from a particular audio packet.

Next, an information handler determines whether the control manager is sending the interrupt command to transmit packet parameters or host parameters. If the control manager is sending packet parameters, then the information handler writes the packet parameters into an information buffer at that current position (the position in the information buffer pointed to by an information buffer write pointer). The information handler then moves the information buffer write pointer to the next available position in the information buffer. In the preferred embodiment, the information handler also copies the host parameters from the previous position in the information buffer (the position that immediately precedes the current position pointed to by the information buffer write pointer) into the current position in the information buffer.

However, if the control manager is relaying host parameters to the information handler, then the information handler writes the host parameters into the current information buffer position (the position in the information buffer pointed to by the information buffer write pointer). The information handler does not move the information buffer write pointer after writing the host parameters into the information buffer.

In a background process for decoding the packets of audio data, the information handler initially uses the packet parameters from the current information buffer location (the location in the information buffer pointed to by a read background pointer) to decode the corresponding packet of audio data stored in DRAM and stores the decoded packet of audio data in audio buffers. Then, the information handler moves the read background pointer to the next parameter buffer in the information buffer. In the preferred embodiment, the information handler may use the packet parameters to perform various functions such as downsampling the packet of audio data, identifying the format of the packet of audio data, or unpacking the packet of audio data.

While the information handler is receiving and writing the parameters to the information buffer and decoding the packet of audio data, the information handler is also outputting decoded packets of audio data to a digital-to-analog converter (DAC). In a foreground process for outputting decoded packets of audio data, the information handler outputs the decoded packets of audio data in the audio buffers to the DAC. Initially, the information handler transfers the current decoded packet of audio data to the DAC. Then, the information handler updates all the packet parameters for the foreground process at the current parameter buffer location (the location in the information buffer pointed to by a read foreground pointer) and moves the read foreground pointer to the next parameter buffer location. The transferred packet of audio data contains that data previously decoded by the information handler during the background process.

The information handler begins transferring the decoded packets of audio data to the DAC at specific times. In the preferred embodiment, the DAC sends an interrupt signal to the information handler to request the immediate transfer of a decoded packet of audio data. The decoded packets of audio data are transferred at a steady rate, which is controlled by the internal clock of the audio decoder. In the preferred embodiment, the internal clock is set to begin transfer of data every 4800 Hz. Alternatively, the internal clock may be set to begin transfer data every 9600 Hz. Thus, in the preferred embodiment, the DAC will interrupt the information handler to request a decoded packet of audio data at a regular frequency of 4800 Hz.

The DAC request for decoded packets of audio data must occur without any delay so that the system user does not hear any interruption in the playback of the audio data by the audio system. Therefore, the packets of audio data must be decoded prior to the conversion by the DAC. The DAC interrupts the information handler at the regular time interval to send the decoded packet of audio data. Once the DAC interrupts the information handler, the information handler stops the background process, begins the foreground process, and transfers the decoded packet of audio data. Once the transfer is complete, the information handler continues the background process until it receives the next request for data from the DAC.

Thus, the present invention provides a system and method for decoding information in a standardized audio file, and provides a system and method for incorporating user commands into the information to control the playback of the audio file.

DETAILED DESCRIPTION OF THE PREFERRED EMBODIMENT

The present invention relates to an improvement in systems that manipulate digital audio information. The following description is presented to enable one of ordinary skill in the art to make and use the invention, and is provided in the context of a patent application and its requirements. Various modifications to the preferred embodiment will be readily apparent to those skilled in the art and the generic principles here may be applied to other embodiments. Thus, the present invention is not intended to be limited to the embodiment shown, but is to be accorded the widest scope consistent with the principles and features described here.

The present invention comprises a system and method to manipulate information in an audio decoder. The invention includes a demultiplexer to separate the information into packets of audio data and packet parameters, a control manager for transferring the packet parameters, and an audio decoder to manipulate the packets of audio data in response to the packet parameters. The invention also includes a control processor for passing host parameters to the control manager and a digital-to-analog converter to convert the audio information from a digital signal into an analog signal.

Figure 1:
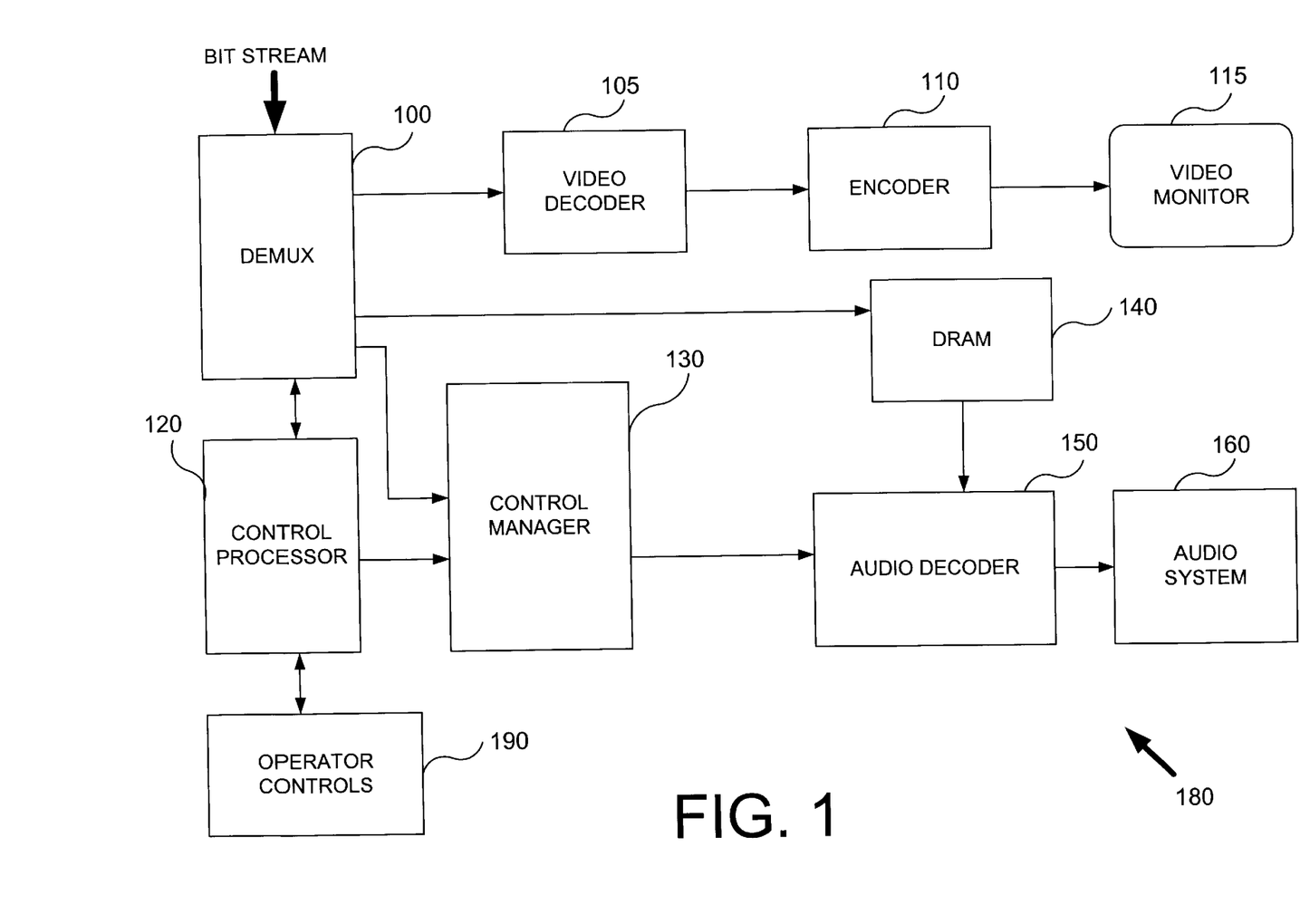
FIG. 1 is a block diagram of one embodiment of a data manipulation system, according to the present invention.

Referring now to FIG. 1, a block diagram of one embodiment of a data manipulation system 180 is shown. In the FIG. 1 embodiment, demultiplexer (DEMUX) 100 receives a data bit stream from a program source such as a digital video disc player. DEMUX 100 then separates the data bit stream into video data and audio packets. The video data of the data bit stream is processed through video decoder 105, encoder 110, and displayed on video monitor 115.

DEMUX 100 receives the audio packets in a packet-by-packet sequence and further splits each audio packet of the data bit stream into a packet of audio data (which may be played back by audio system 160) and packet parameters (information relating to the packet of audio data). System 180 stores the packet of audio data from the audio packets into DRAM 140. Control manager 130 receives the packet parameters from DEMUX 100 and responsively sends the packet parameters to audio decoder 150. Audio decoder 150 uses each set of packet parameters to decode a directly corresponding packet of audio data. Preferably, audio decoder 150 uses the packet parameters to perform various functions such as unpacking the packet of audio data, identifying the format of the packet of audio data, and down-sampling the packet of audio data.

In the preferred embodiment, audio decoder 150 may further convert the packet of audio data from digital to analog audio data and transfer the converted analog audio data to audio system 160 for playback. In the preferred embodiment, the audio packets are received as Linear Pulse Code Modulation (LPCM) data from a Digital Video Disc (DVD). Alternatively, data manipulation system 180 may be used to decode any compatible type of data, and, therefore, is not limited to the decoding of audio data. In addition, data manipulation system 180 may be used to decode data from any appropriate source.

In addition, a system user may enter control commands through operator controls 190 to control audio system 160. For example, the system user may enter commands to control the output channel used by audio system 160, the type of audio mixing for the playback of the packet of audio data, and the output volume of audio system 160. Control processor 120 translates the received control commands into host parameters that the control processor 120 then passes to control manager 130.

Control manager 130 provides the packet parameters received from DEMUX 100 and the host parameters received from control processor 120 to audio decoder 150. Audio decoder 150 then uses the packet parameters to control the decoding of the corresponding packet of audio data. Audio decoder 150 also passes the host parameters to audio system 160 to control playback of the packet of audio data.

The packet parameters and packet of audio data that were originally included in the same audio packet (and that were separated by DEMUX 100) must be linked together in some manner. Preferably, data manipulation system 180 maintains pointers to the packets of audio data and the packet parameters in order to process the correct set of packet parameters with its associated packet of audio data. Each set of packet parameters corresponds to only one packet of audio data, and likewise, each packet of audio data has a single associated set of packet parameters.

The operation of the FIG. 1 system 180 is an ongoing process in which data manipulation system 180 continuously processes the received data bit stream until all the audio packets are processed or the system user halts the operation of system 180.

Figure 2A:
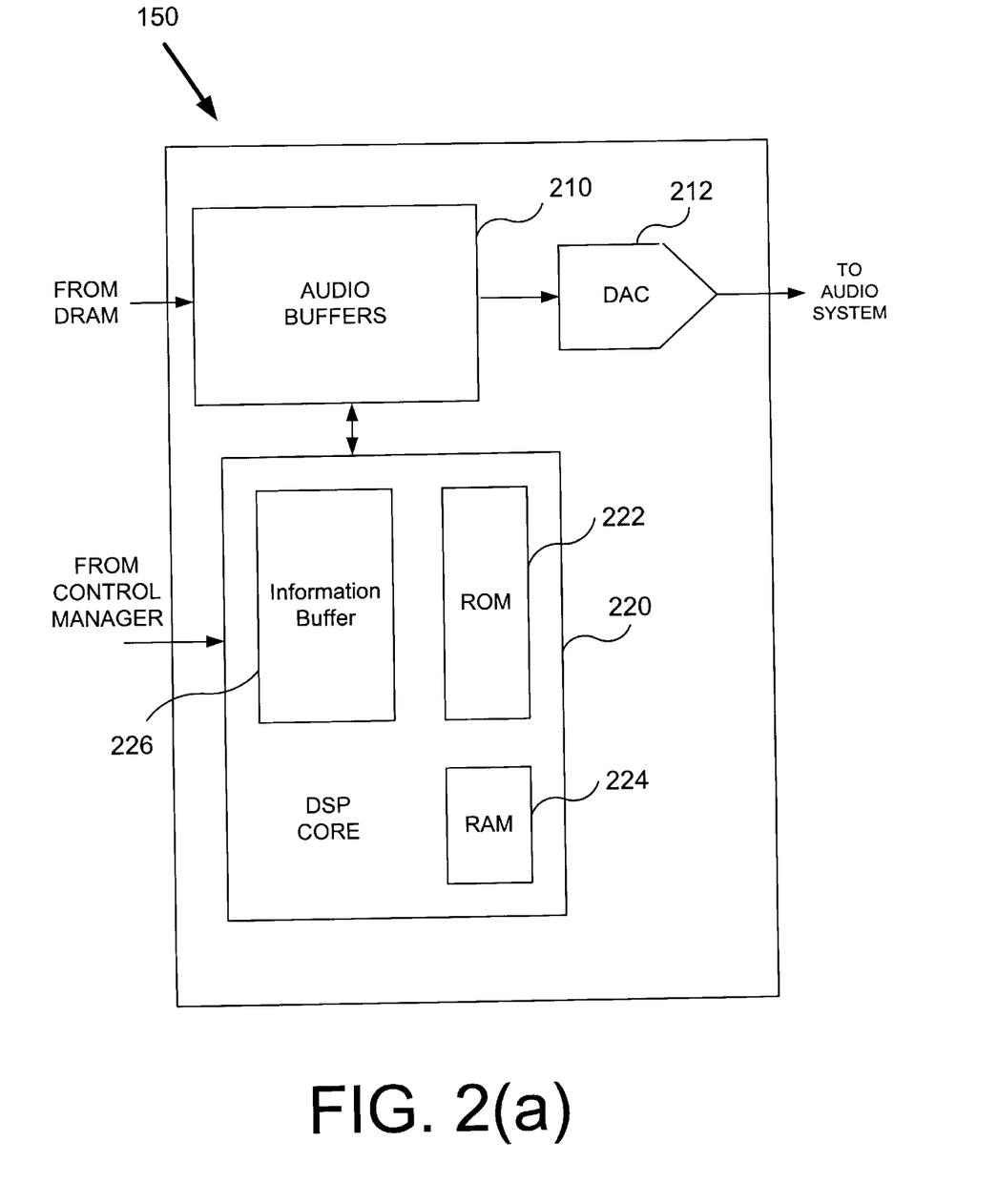
FIG. 2(a) is a block diagram of one embodiment of an audio decoder, according to the present invention.

Referring now to FIG. 2(a), a block diagram of one embodiment for audio decoder 150 is shown. In the FIG. 2(a) embodiment, audio decoder 150 includes a processor 220 for processing and manipulating the packets of audio data. Packet parameters and host parameters are received from control manager 130 and stored into information buffer 226 within processor 220. Processor 220 also contains read-only memory (ROM) 222 and random-access memory (RAM) 224. Audio decoder 150 also includes audio buffers 210 for receiving the packets of audio data from DRAM 140. Instructions contained within ROM 222 use the packet parameters in information buffer 226 to process a directly corresponding packet of audio data in DRAM 140 and send the processed packet of audio data via audio buffers 210 to digital-to-analog converter (DAC) 212. DAC 212 converts the digital audio data into analog audio data and then transfers the analog audio data to audio system 160.

Figure 2B:
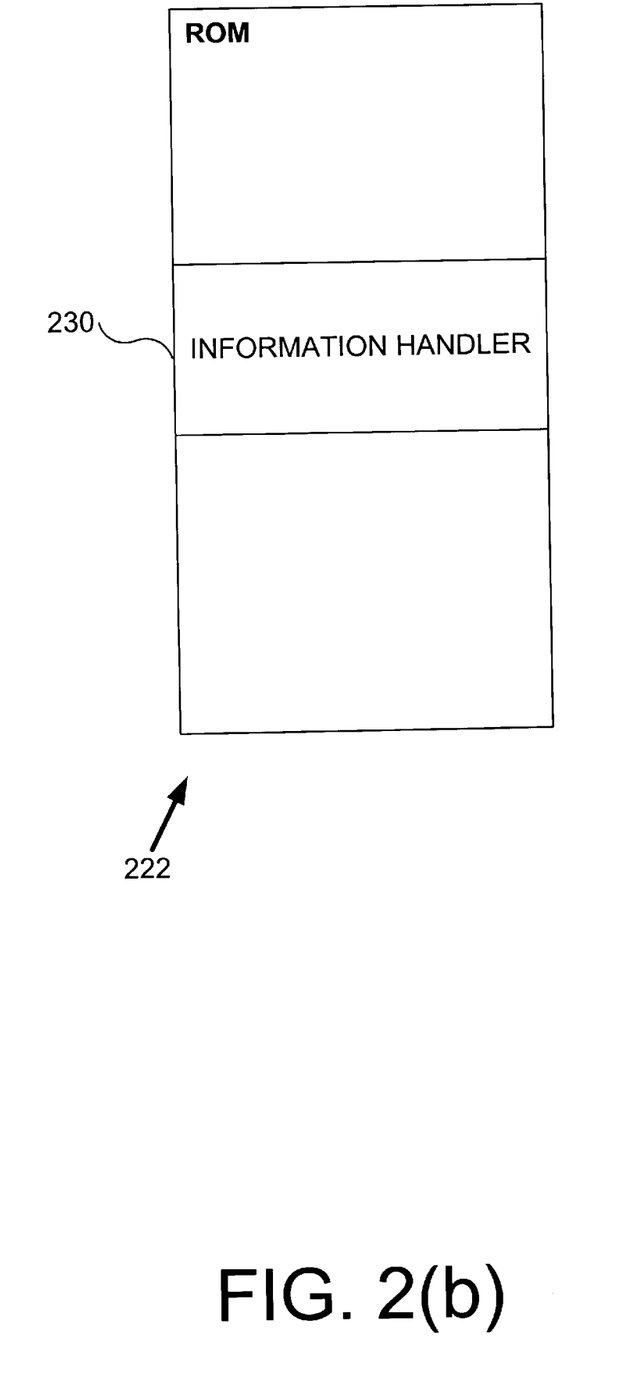
FIG. 2(b) is a representation of one embodiment of the read-only memory of FIG. 2(a)

Referring now to FIG. 2(b), a representation of one embodiment of read-only memory (ROM) 222 of FIG. 2(a) is shown. Preferably, ROM 222 includes information handler 230. Information handler 230 includes a series of instructions that are executable by processor 220 to advantageously decode the packets of audio data. Information handler 230 receives the packet parameters from control manager 130 and stores the packet parameters into information buffer 226. Information handler 230 uses each set of packet parameters to decode a specific packet of audio data. Preferably, information handler 230 maintains the correspondence between the packet of audio data and its associated packet parameters by maintaining pointers to the two sets of data.

In addition, information handler 230 includes a series of instructions to receive host parameters from control manager 130 and to store the host parameters into information buffer 226. In the preferred embodiment, information handler 230 subsequently transfers the decoded packet of audio data to DAC 212.

Figure 3:
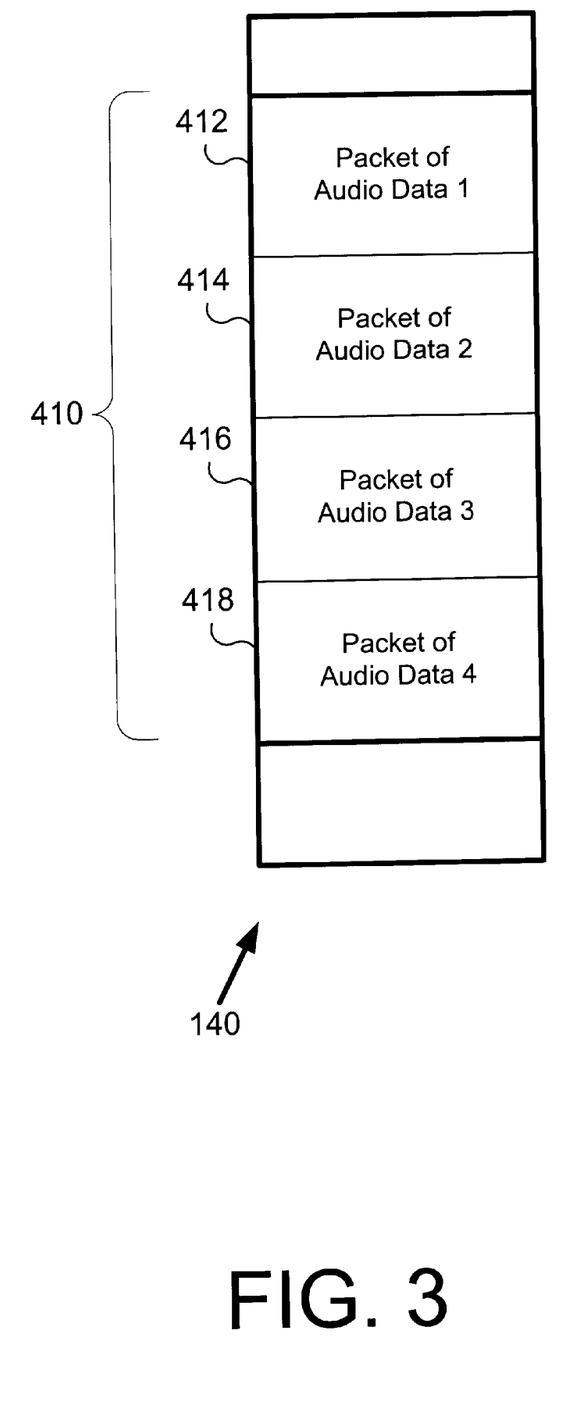
FIG. 3 is a representation of one embodiment for the DRAM of FIG. 1.

Referring now to FIG. 3, a representation of one embodiment of dynamic random-access memory (DRAM) 140 of FIG. 1 is shown. In the FIG. 3 embodiment, DRAM 140 is preferably a first-in-first-out (FIFO) queue for storing multiple packets of audio data 410. In the FIG. 3 embodiment, DRAM 140 includes packet of audio data 1 (412) (the earliest packet of audio data 410 stored into DRAM 140), through packet of audio data 4 (418) (the most recent packet of audio data 410 stored into DRAM 140), although DRAM 140 may alternatively include more or less than four packets of audio data 410. Alternatively, DRAM 140 may be implemented as any equivalent data structure, such as a linked-list. In the FIG. 3 embodiment, after information handler 230 stores a packet of audio data 410 into packet of audio data 4 (418), information handler 230 stores the next packet of audio data 410 received from DEMUX 100 into packet of audio data 1 (412).

In the preferred embodiment, each packet of audio data 410 has a maximum size of 2010 bytes. Preferably, DRAM 140 is eight kilobytes in length and, thus, DRAM 140 may contain up to four packets of audio data 410 of the maximum size. In the preferred embodiment, DRAM 140 includes four packets of audio data 410. Each packet of audio data 410 preferably includes the audio information to be played back by audio system 160. In the preferred embodiment, audio decoder 150 receives packets of audio data 410 in LPCM format from DEMUX 100, and processes and converts packets of audio data 410 into analog data. Audio decoder 150 then preferably sends the converted analog data to audio system 160.

Figure 4:
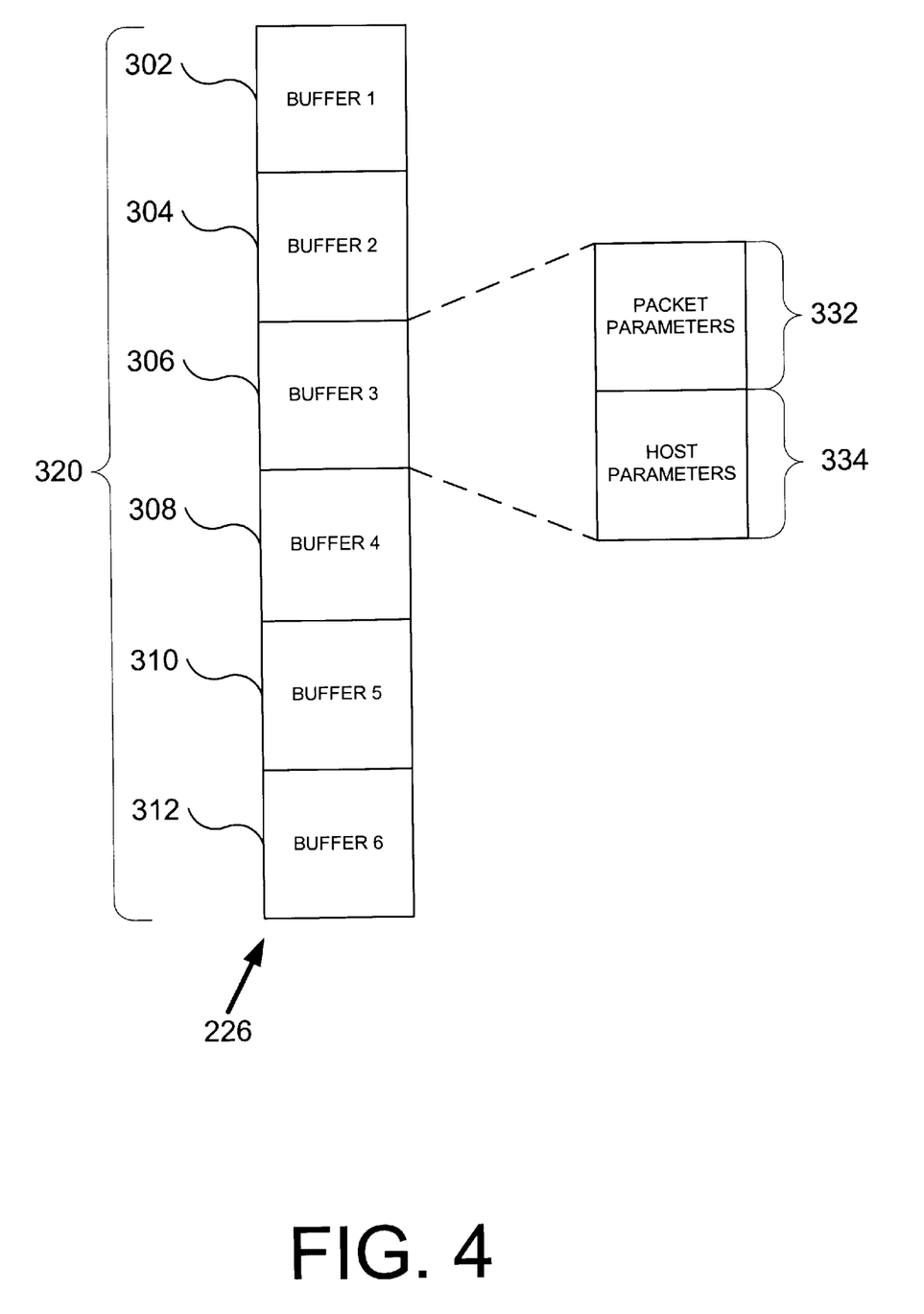
FIG. 4 is a representation of one embodiment for the information buffer of FIG. 2(a)

Referring now to FIG. 4, a representation of one embodiment of information buffer 226 of FIG. 2(a) is shown. In the FIG. 4 embodiment, information buffer 226 includes a series of parameter buffers 320. In the preferred embodiment, information buffer 226 contains from buffer 1 (302) through buffer 6 (312). Each parameter buffer 320 includes an area to store packet parameters 332 and an area to store host parameters 334. Information handler 230 receives packet parameters 322 from control manager 130 and stores packet parameters 332 into information buffer 226. In addition, information handler 230 receives host parameters 334 from control manager 130 and stores host parameters 334 into information buffer 226.

Control manager 130 transfers packet parameters 332 for every packet of audio data 410 that DEMUX 100 sends to DRAM 140, and each parameter buffer 320 preferably corresponds to only one packet of audio data 410. Thus, there is a set of packet parameters 332 for every packet of audio data 410. When control manager 130 notifies information handler 230 that control manager 130 is sending packet parameters 332, then information handler 230 stores the packet parameters 332 into the current information buffer 226 location (the location in information buffer 226 pointed to by an information buffer write pointer). Once information handler 230 finishes storing packet parameters 332, then information handler 230 copies host parameters 334 from the immediately preceding information buffer 226 location into the current information buffer 226 location (the location in information buffer 226 pointed to by the information buffer write pointer). Information handler 230 then moves the information buffer write pointer to point to the next position in information buffer 226.

In addition, information handler 230 may save updated host parameters 334 received from control manager 130 into information buffer 226. When control manager 130 notifies information handler 230 that control manager 130 is sending host parameters 334, information handler 230 stores the host parameters 334 into the current information buffer 226 location (the location in information buffer 226 pointed to by the information buffer write pointer). In the preferred embodiment, host parameters 334 are updated only when the system user enters control commands through operator controls 190.

In the preferred embodiment, packet parameters 332 may be stored into information buffer 226 at the same time that the corresponding packet of audio data is stored into DRAM 140. Preferably, information handler 230 stores updated host parameters 334 at the current information buffer 226 location (the location in information buffer 226 pointed to by the information buffer write pointer) at any time that information handler 230 is not storing packet parameters 332 into information buffer 226.

As discussed in reference to FIG. 3, DRAM 140 preferably includes four packets of audio data 410. Therefore, in order to maintain the one-to-one correspondence between a packet of audio data 410 and a set of packet parameters 332, information buffer 226 includes at least five parameter buffers 320, and in the preferred embodiment, information buffer 226 includes six parameter buffers 320. Alternatively, information buffer 226 may contain more or less than six parameter buffers 320. Preferably, information buffer 226 includes six parameter buffers 320 to insure that packet parameters 332 are saved and that the corresponding packet of audio data 410 is processed by information handler 230 before DAC 212 requests the data transfer from information handler 230.

Figure 5:
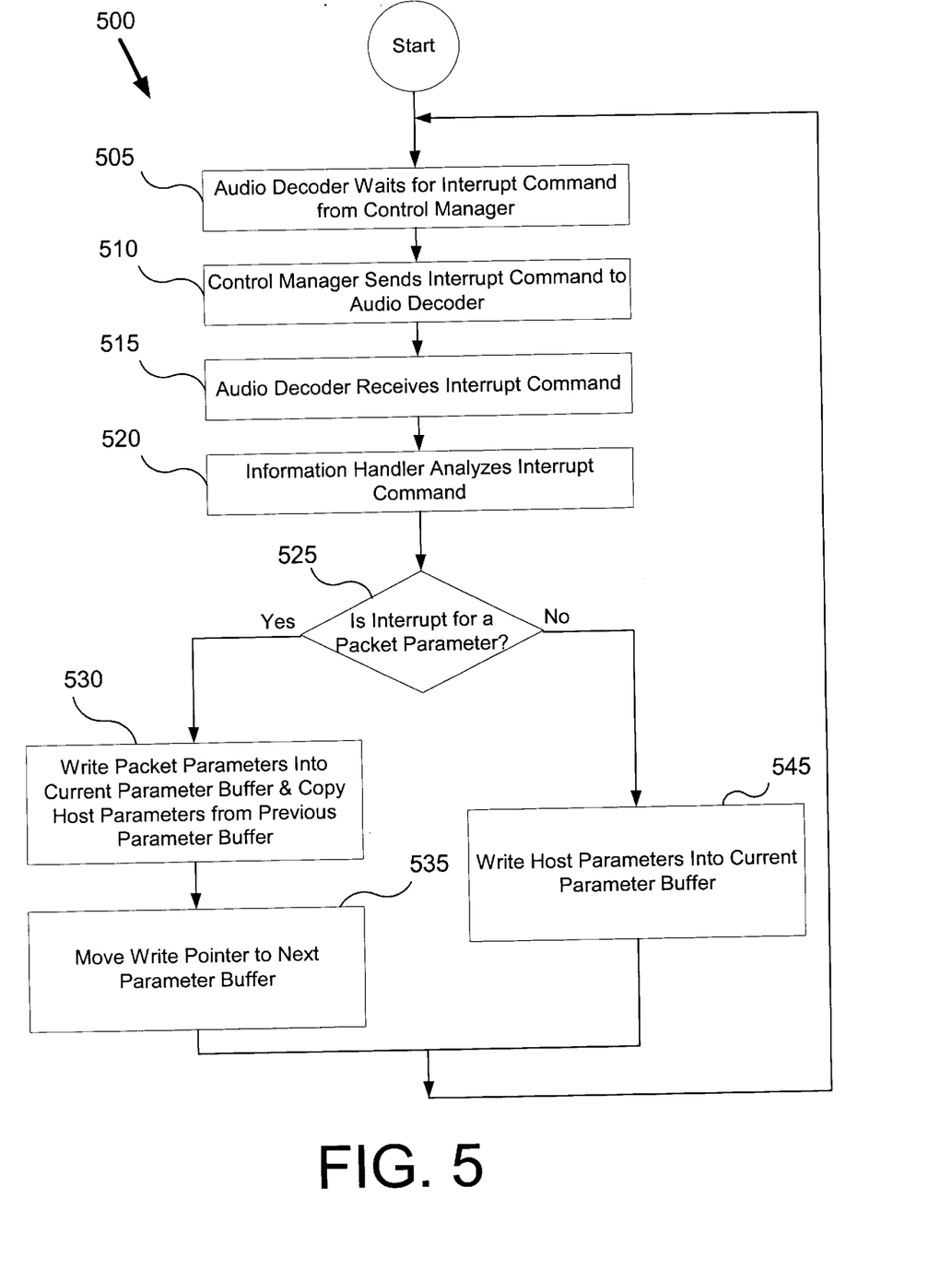
FIG. 5 is a flowchart of the preferred method steps for capturing packet parameters and host parameters, according to the present invention.

Referring now to FIG. 5, a flowchart of the preferred method steps for capturing packet parameters 332 and host parameters 334 is shown. Initially, in step 505, audio decoder 150 waits to receive an interrupt command from control manager 130. Next, at step 510, control manager 130 sends the interrupt command to audio decoder 150. Then, at step 515, audio decoder 150 receives the interrupt command. Information handler 230, at step 520, analyzes the interrupt command.

Next, at step 525, information handler 230 determines whether control manager 130 is sending the interrupt command to send packet parameters 332 or to send host parameters 334. If control manager 130 sends an interrupt command to send packet parameters 332, then, at step 530, information handler 230 writes the packet parameters 232 into the current parameter buffer 320 location (the location in information buffer 226 pointed to by an information buffer write pointer). In the preferred embodiment, information handler 230 also copies host parameters 334 from the previous parameter buffer 320 location (the location immediately proceeding parameter buffer 320 location currently pointed to by the information buffer write pointer) into the current parameter buffer 320 location. Then, in step 535, information handler 230 moves the information buffer write pointer to the next available parameter buffer 320 in information buffer 226. Then information handler 230 returns to step 505 to capture the next set of packet parameters 332 and/or host parameters 334.

Referring again to foregoing step 525, if control manager 130 sends host parameters 334 to information handler 230, information handler 230, at step 545, writes the host parameters 234 into the current parameter buffer 320 location (the location in information buffer 226 pointed to by the information buffer write pointer). Then, information handler 230 returns to step 505 to capture the next set of packet parameters 332 and/or host parameters 334.

Figure 6:
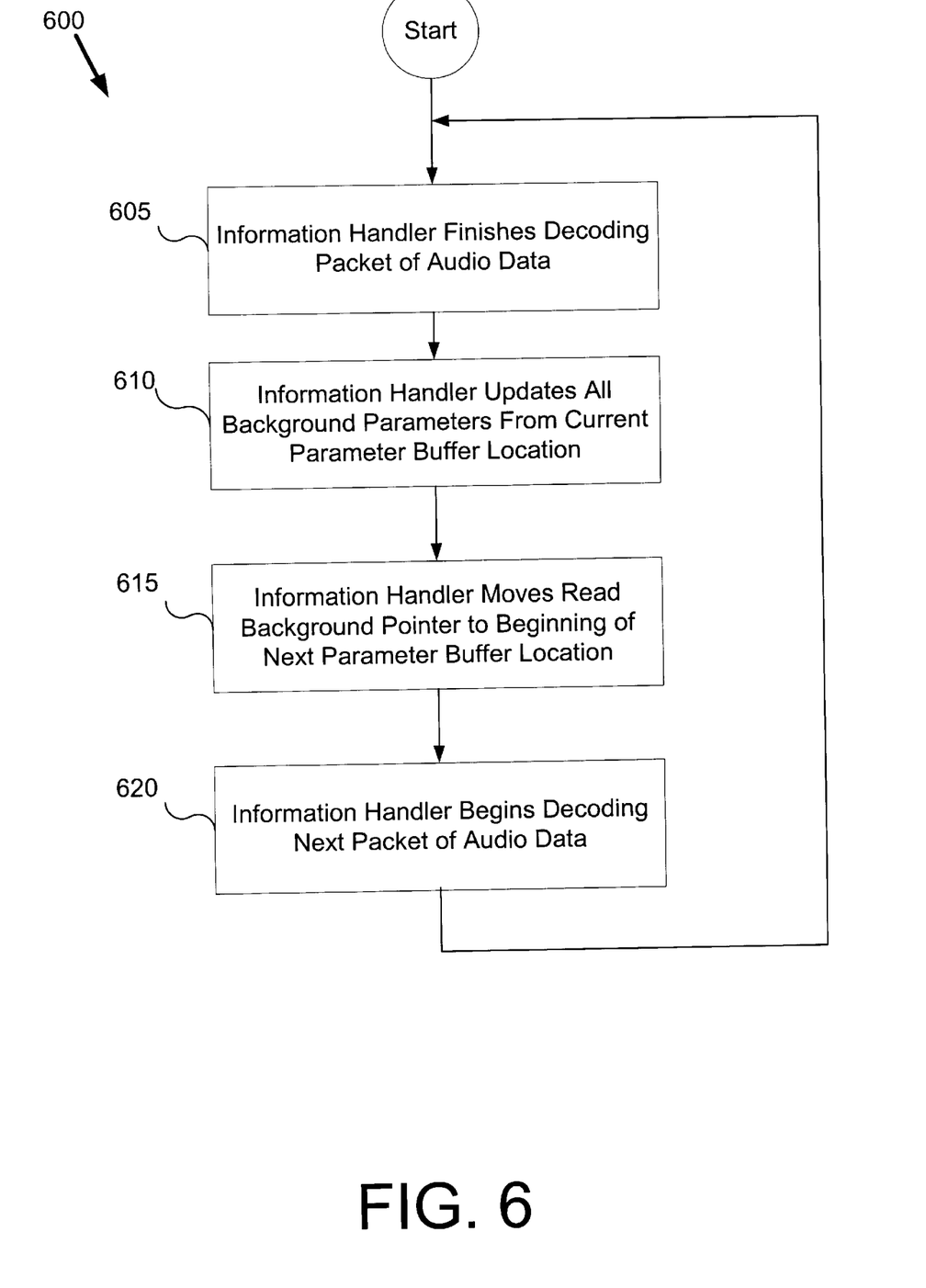
FIG. 6 is a flowchart of the preferred method steps for performing the background process of the present invention.

Referring now to FIG. 6, a flowchart of the preferred method steps for performing a background process 600 of the present invention is shown. Initially, in step 605, information handler 230 finishes decoding a packet of audio data 410 that is still in process (from a prior execution of step 620 below). Then, in step 610, information handler 230 updates all packet parameters 332 from the current parameter buffer 320 location (the location pointed to by a read background pointer). Then, in step 615, information handler 230 moves the read background pointer to the beginning of the next parameter buffer 320 location in information buffer 226.

Next, in step 620, information handler 230 begins decoding the next packet of audio data 410 from DRAM 140 (the packet of audio data 410 corresponding to packet parameters 332 pointed to by the read background pointer). Information handler 230 advantageously uses the corresponding packet parameters 332 to decode the packet of audio data 410 and save the decoded packet of audio data 410 into audio buffers 210. In the preferred embodiment, information handler 230 may perform various functions including down-sampling packet of audio data 410, identifying the format of packet of audio data 410, and unpacking packet of audio data 410. Background process 600 then returns and continues processing at step 605.

Once background process 600 finishes decoding the current packet of audio data 410, it may begin processing the next packet of audio data 410 from DRAM 140. The processing of a packet of audio data 410 by background process 600 must be completed prior to the time that DAC 212 converts the packet of audio data 410 into analog format and outputs the converted analog packet of audio data 410 to audio system 160.

Figure 7:
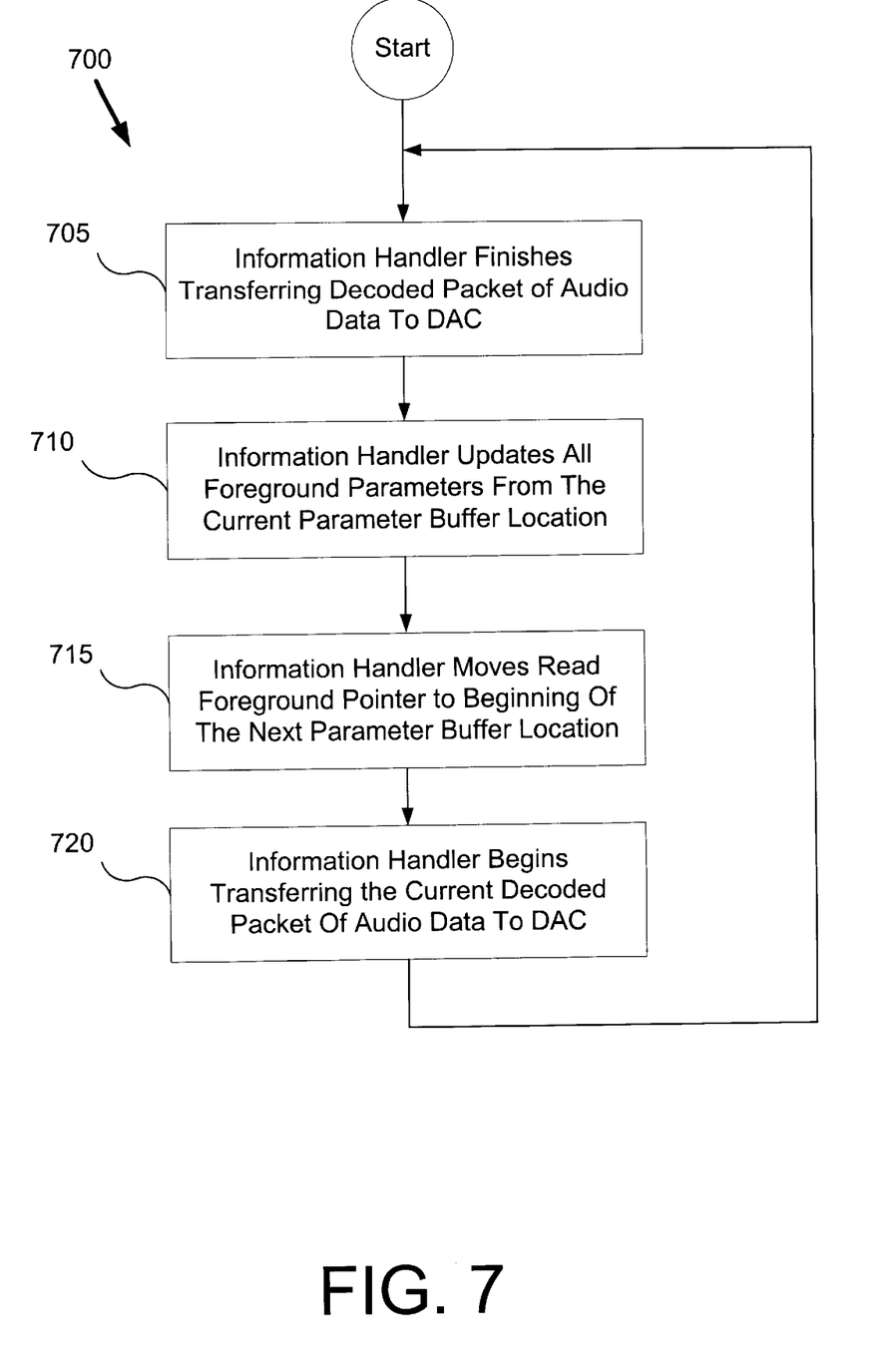
FIG. 7 is a flowchart of preferred method steps for performing the foreground process of the present invention.

Referring now to FIG. 7, a flowchart of preferred method steps for performing foreground process 700 of the present invention is shown. Initially, in step 705, information handler 230 finishes transferring any decoded packet of audio data in audio buffers 210 to DAC 212 that is still in process (from a prior execution of step 720 below). Next, in step 710, information handler 230 updates all packet parameters 332 for the foreground process 700 from the current parameter buffer 320 location (the location in parameter buffer 320 pointed to by a read foreground pointer). Parameter buffer 320 includes packet parameters 332 corresponding to a packet of audio data 410 and any host parameters 334 loaded by information handler 230.

Then, in step 715, information handler 230 moves the read foreground pointer to the next parameter buffer 320 location in information buffer 226. Then, in step 720, information handler 230 begins transferring the current decoded packet of audio data in audio buffers 210 (the decoded packet of audio data corresponding to parameter buffer 320 pointed to by the read foreground pointer) to DAC 212. The current decoded packet of audio data in audio buffers 210 includes the packet of audio data 410 previously decoded by information handler 230 during background process 600 at step 620 of FIG. 6. Foreground process 700 then returns and continues processing at step 705.

In the preferred embodiment, information handler 230 begins transferring decoded packets of audio data at specific times. DAC 212 preferably sends an interrupt signal to information handler 230 to request the immediate transfer of a decoded packet of audio data from audio buffers 210. The decoded packet of audio data is transferred at a steady rate, which is controlled by the internal clock of audio decoder 150. In the preferred embodiment, the internal clock may be set to begin transfer of data every 4800 Hz. Alternatively, the internal clock may be set to begin transfer of data every 9600 Hz. Thus, in the preferred embodiment, DAC 212 interrupts information handler 230 and requests data at the regular frequency of 4800 Hz.

The DAC 212 request for data must occur without any delay so that the system user does not hear any interruption in the playback of the audio information by audio system 160. Therefore, packet of audio data 410 must be decoded and saved into audio buffers 210 by background process 600 before the conversion of the decoded packet of audio data by DAC 212. For example, background process 600 initially decodes packet of audio data 1 (412) in DRAM 140. Once background process 600 finishes decoding packet of audio data 1 (412), then background process 600 may start decoding packet of audio data 2 (414). DAC 212 interrupts information handler 230 at the regular time interval to request a decoded packet of audio data. Once DAC 212 interrupts information handler 230, then information handler 230 stops background process 600, begins foreground process 700, and transfers the corresponding decoded packet of audio data.

Once the transfer is complete, information handler 230 returns to processing background process 600 until it receives the next request for data from DAC 212. In this example, background process 600 finishes decoding packet of audio data 2 (414), then decodes packet of audio data 3 (416), and then decodes packet of audio data 4 (418). Background process 600 then continues by decoding packet of audio data 1 (412) through packet of audio data 4 (418) until there is no more packets of audio data 410 to decode. DAC 212 interrupts information handler 230 at the specified time to transfer the decoded packets of audio data.

Background process 600 decodes each packet of audio data 410 in turn until there are no more packets of audio data 410 loaded into DRAM 140. Data manipulation system 180 then continues this foreground/background process until all the audio packets are processed through audio system 160, or until the system user terminates the process.

The invention has been explained above with reference to a preferred embodiment. Other embodiments will be apparent to those skilled in the art in light of this disclosure. For example, the present invention may be readily implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A device for manipulating information including parameters and data, said device comprising:
    an information handler configured to control said parameters, said parameters including packet parameters and host parameters that are sent by a control processor to said information handler, said packet parameters and said host parameters being stored into a series of explicitly dedicated parameter buffer locations; and
    a decoder coupled to said information handler to manipulate said data by using said packet parameters and said host parameters from said series of explicitly dedicated parameter buffer locations.

2. The device of claim 1 wherein said data is audio data.

3. The device of claim 1 wherein said data includes packets of data, and wherein said decoder uses said parameters to manipulate said packets of data.

4. The device of claim 1 wherein said decoder unpacks said data and down-samples said data.

5. The device of claim 1 further comprising:
    a data buffer connected to said device for storing said data.

6. The device of claim 5 wherein said data buffer includes a first-in-first-out queue.

7. The device of claim 1 further comprising:
    a converter for converting said data from a first format to a second format.

8. The device of claim 7 wherein said converter converts said data from digital format to analog format.

9. The device of claim 1 wherein said information is in a Linear Pulse Code Modulation format.

10. The device of claim 1 wherein said data is digital data received from one of a digital video disc and digital video broadcast.

11. The device of claim 1 further comprising:
    a parameter buffer connected to said information handler for storing said packet parameters and said host parameters.

12. The device of claim 11 wherein said parameter buffer includes a first-in-first-out queue.

13. A system for manipulating information, comprising:
    means for separating said information into data and packet parameters;
    means for storing said data;
    means for analyzing said packet parameters;
    means for receiving host parameters from one or more external sources;
    means for storing said packet parameters and said host parameters in a series of explicitly dedicated parameter buffer locations;
    means for manipulating said data in response to said packet parameters and said host parameters; and
    means for converting said data from a first format to a second format.

14. The system of claim 13 further comprising:
    means for receiving an interrupt command;
    means for analyzing said interrupt command;
    means for writing said packet parameters into a current position in said parameter buffer;
    means for writing said host parameters from a previous position in said parameter buffer into said current position in said parameter buffer; and
    means for moving a write pointer to a next position in said parameter buffer.

15. The system of claim 13 further comprising:
    means for receiving an interrupt command;
    means for analyzing said interrupt command; and
    means for writing said host parameters into a current position in said parameter buffer.

16. The system of claim 13 further comprising:
    means for updating packet parameters at a current position in a parameter buffer;
    means for decoding data corresponding to said packet parameters; and
    means for moving a read background pointer to a next position in said parameter buffer.

17. The system of claim 13 further comprising:
    means for analyzing said packet parameters at a current position in said parameter buffer;
    means for decoding said data corresponding to said packet parameters;
    means for transferring said data corresponding to said packet parameters to a digital-to-analog converter; and
    means for moving a read foreground pointer to a next position in said parameter buffer.

18. A method of manipulating information, comprising the steps of:
    separating said information into data and packet parameters;
    storing said packet parameters into a series of explicitly dedicated parameter buffer locations;
    receiving host parameters from one or more external sources;
    storing said host parameters into said series of explicitly dedicated parameter buffer locations; and
    manipulating said data in response to said packet parameters and said host parameters.

19. The method of claim 18, wherein said step of storing said packet parameters further comprises the steps of:

receiving an interrupt command;

analyzing said interrupt command;

writing said packet parameters into a current position in a parameter buffer;

writing host parameters from a previous position in said parameter buffer into said current position; and moving a write pointer to a next position in said parameter buffer.

20. The method of claim 18, wherein said step of storing said host parameters further comprises the step of:

receiving an interrupt command;

analyzing said interrupt command;

writing said host parameters into a current position in a parameter buffer.

21. The method of claim 18 further comprising the steps of:

storing said data in a data buffer; and converting said data from a first format to a second format.

22. The method of claim 21 wherein said data is converted from digital audio format to analog audio format.

23. A computer-readable medium comprising program instructions for manipulating information, by performing the steps of:

separating said information into data and packet parameters;

storing said packet parameters into a series of explicitly dedicated parameter buffer locations;

receiving host parameters from one or more external sources;

storing said host parameters into said series of explicitly dedicated parameter buffer locations; and manipulating said data in response to said packet parameters and said host parameters.

24. The medium of claim 23 further comprising the steps of:

receiving an interrupt command;

analyzing said interrupt command;

writing said packet parameters into a current position in a parameter buffer;

writing host parameters from a previous position in said parameter buffer to said current position; and moving a write pointer to a next position in said parameter buffer.

25. The medium of claim 23, wherein said step of storing said host parameters further comprises the steps of:

receiving an interrupt command;

analyzing said interrupt command; and writing said host parameters into a current position in said parameter buffer.

26. The medium of claim 23 further comprising the steps of:

storing said data in a data buffer; and converting said data from a first format to a second format.

27. The medium of claim 26 wherein said data is converted from digital audio format to analog audio format.

28. The medium of claim 23 further comprising the steps of:

updating said packet parameters at a current position in a parameter buffer;

decoding said data corresponding to said packet parameters;

moving a read background pointer to a next position in said parameter buffer.

29. The medium of claim 23 further comprising the steps of:

updating packet parameters at a current position in a parameter buffer;

transferring said data corresponding to said packet parameters to a digital-to-analog converter; and moving a read foreground pointer to a next position in said parameter buffer.

* * * * *